Patented Mar. 8, 1949

2,464,127

UNITED STATES PATENT OFFICE 2,464,127

METHOD OF ACTIVATING ACID ACTIVATABLE CLAYS

Wright W. Gary, Los Angeles, Calif., assignor to Filtrol Corporation, Los Angeles, Calif., a corporation of Delaware No Drawing. Application May 19, 1944, Serial No. 536,429

5 Claims. (Cl. 252—450)

1

This application is a continuation-in-part of my application Serial No. 490,117, filed June 7, 1943 (now abandoned). This invention relates to a process for the production of active adsorbents and catalysts from acid activatable clays.

It is well known that the sub-bentonites, a class of montmorillonite clays containing calcium and magnesium in base exchange position, may be activated by acid treatment to produce active adsorbents and catalysts. They have been widely used for such purposes both in the decolorization and clarification of oils both of mineral, animal, and vegetable character and as catalysts, particularly as cracking catalysts.

A typical example of such activatable clay on a volatile free basis is given by the following analysis:

|  | Per cent |
|---|---|
| Silica, $SiO_2$ | 67.26 |
| Titanium oxide, $TiO_2$ | 0.27 |
| Aluminum oxide, $Al_2O_3$ | 19.53 |
| Ferric oxide, $Fe_2O_3$ | 1.84 |
| Manganese oxide, MnO | 0.82 |
| Magnesium oxide, MgO | 6.93 |
| Calcium oxide, CaO | 3.21 |

The method employed in this art to activate such clay consists in mixing the clay and the total amount of acid to be employed in the treat and in permitting the reaction to proceed in such mixture to cause the desired extraction of alumina. The acid, which may be a mineral acid, such as $H_2SO_4$ or HCl, is added to the clay in concentration ranging from about 12% to 20%, and upon the completion of the reaction the acid concentration is reduced to about 2% to 5%. The concentration is calculated as based on the total water in the mix including the moisture in the clay charged. The weight of acid, calculated as anhydrous, ranges from about 30% to 40% of the weight of the clay, based on volatile free clay. Such ratio of acid to clay is hereinafter termed "dosage." The acid is consumed to form sulfates of the extracted metals, i. e., aluminum sulfate, iron sulfate, calcium sulfate, and magnesium sulfate, etc.

It has also been proposed to pass clay to be treated countercurrent to acid. The untreated raw clay is contacted with the weak acid at the end of the system and treated clay is withdrawn from the point in the system where fresh acid is added. In such process it is claimed that an increased utilization of acid is employed.

In contacting the acid and clay, it is desirable for purposes of economy to employ as high a solids concentration (i. e., weight ratio of clay to weight of total mix) as possible within the limits of a free-flowing mixture.

The greater the acid dosage employed at any concentration, in either of the above methods, the lower the solids concentration which is permissible. It has been found that the permissible maximum solids concentration in a treat mixture which will be sufficiently fluid to be adequately agitated and mixed during treatment is about 30 to 35 pounds of clay, calculated as anhydrous, per 100 pounds of mixture. Thus, for example, when employing an acid dosage of 35 pounds per 100 pounds of volatile free clay at an initial concentration of 15%, the solids concentration, employing a clay of 20% V. M. (total water in the clay) is 30 pounds by weight of clay, calculated as volatile free, per 100 pounds of reaction mix. When employing a dosage of 50 pounds and an acid concentration of 15%, the permissible solids concentration is about 23%, and when employing a dosage of 50 pounds and 10% concentration, the permissible solids concentration is about 16.7%. It will thus be seen how drastically the amount of clay which can be treated in a reactor diminishes as the dosage, at a constant concentration, rises or falls as the concentration, at a constant dosage, falls.

I have found that I can increase the permissible solids concentration and thus increase the economy of the process by controlling the initial and terminal concentration of acid and staging the addition of acid, and also by maintaining the acid concentration substantially constant throughout the treat. Thus, for example, by distributing the 50-pound dosage so that the acid is added gradually to maintain the concentration at about a constant value, I can obtain high solids concentration in excess of that which could be obtained if all the acid to be employed in the treat is mixed with the clay undergoing treatment, as is the case in the prior art methods referred to above. In the above case I may mix my clay with a 10% acid concentration, employing an amount of acid equivalent to about 40–50% of the acid in the original mixture and add the remaining 60–50% of acid gradually during the treat to maintain the acidity at about 5–15%.

By such procedure I have been able to enjoy the high solids concentration of from 25–35 pounds of clay, calculated as volatile free, per 100 pounds of reaction mix while employing relatively high acid dosages and also while employing the desirable low concentrations of from about 5 to about 15%, which, together with such high acid dosages of from 40 to 125 pounds of acid, have proved to be particularly efficacious in the treatment of acid activatable clays for the production of adsorbents and catalysts.

I have also discovered that, by controlling the acid concentration of the mixture of acid and clay to maintain the acidity of the reaction mixture throughout the treatment at a substantially constant concentration of about 5 to 30% $H_2SO_4$ and preferably about 7 to 15%, I am able to produce a clay containing the least iron.

The value of a catalyst as a cracking catalyst is in part dependent on the amount of coke deposited on the catalyst during oil cracking. Iron in the clay has a deleterious effect on this property. Iron is found in clay of this type both as the silicate naturally present in such clays and also as other iron compounds, particularly iron oxide. While I do not wish to be bound by any theory of the origin of such iron compounds, I believe that this detrimental iron oxide is, in part at least, deposited by hydrolysis of the iron salts during the acid treatment and washing of the clay.

I have found that in my process by keeping the acid concentration in the treating mix above about 7% to 8%, the resultant acid activated clay contains the least iron compounds, and this, I believe, is because the hydrolysis of the extracted iron salts is repressed when employing such concentrations.

I have also found that, when controlling the concentration of the initial acid and maintaining the concentration of the acid during treatment, the acid at the termination of the treat may be re-used to treat a new portion of clay. In addition, I have discovered that in such re-cycle operations the concentration of salts in the acid liquor reaches an equilibrium value and, by judicious withdrawal of an amount of re-cycled solution equivalent to the acid added in stages to the treat, this equilibrium may be maintained. This withdrawal, therefore, permits the re-use of the acid after separation from the treated clay.

It is therefore an object of my invention to treat acid activatable clays with acid at a concentration of about 6% to 35%, and preferably in the range of about 7% to 15%.

It is an additional object of my invention to supply the acid required for the treatment in stages during said treatment to maintain said acid concentration substantially constant.

As an illustration of my invention and not for purposes of limiting the same, the following examples may be taken as describing a useful embodiment of my invention.

EXAMPLE I

The clay described above was treated with a total amount of 50 pounds of acid, calculated as anhydrous, per 100 pounds of clay, calculated as volatile free. The clay, after suitable grinding, was dispersed in water and sufficient acid added to adjust the concentration to 10%. An amount equivalent to 25 pounds of acid, calculated as anhydrous, per 100 pounds of volatile free clay was added to the reaction mix, giving such 10% concentration. The clay and acid were agitated with air and steam at an elevated temperature of about 180–212° F. As previously described, the concentration is calculated as based on total water in mix, including added water plus the moisture in the clay as charged. As acid was consumed, additional concentrated acid was added to maintain the concentration at 10%. At the end of two hours and forty-five minutes the treat was dumped. The clay was washed and filtered and dried. The total acid consumed was 26.4 pounds of acid, calculated as anhydrous, per 100 pounds of original clay charge, calculated as volatile free.

EXAMPLE II

The same clay was treated under the same conditions except that the entire acid dosage, amounting to 35 pounds of acid, calculated as anhydrous, per 100 pounds of clay, calculated as volatile free, was added at the beginning of the treat. The concentration of the acid varied from an initial concentration of 15% acid to a concentration of about 3.5 to 4%. The amount of acid consumed was the same as in the previous treat, to wit, 26.4 pounds of acid, calculated as anhydrous, per 100 pounds of original clay charge, calculated as volatile free.

The following table gives the analysis of the clay produced in Examples I and II:

Table 1

|  | Percent $SiO_2$ | Percent $Al_2O_3$ | Percent $Fe_2O_3$ | Percent $CaO$ | Percent $MgO$ |
|---|---|---|---|---|---|
| Example I | 75.7 | 11.52 | 0.97 | 3.65 | 3.68 |
| Example II | 72.56 | 11.95 | 1.82 | 3.29 | 4.34 |

It will be observed that although the degree of treatment in the two methods is the same as indicated by the same acid consumption and substantially the same $Al_2O_3$ content in the treated clay, the clay formed by the conventional commercial method of Example II had a higher iron content, in fact, almost double the iron content of Example I. Also it will be observed that the per cent of iron extracted in the method of Example I is more than 50% of the original iron content, whereas in Example II about 10% of the iron was extracted.

Both clays were washed, filtered, dried, ground, and subsequently molded into pellets of $\frac{3}{16}''$ in diameter and $\frac{3}{16}''$ long and employed as cracking catalyst according to the following process.

The dried catalyst pellet, such as the acid treated clay pellet formed as described above, is introduced into an oven maintained at 1050° F. and the pellets maintained at this temperature for a period of five hours. The catalyst is then cooled without access to air in a desiccator or similar container and upon cooling is transferred to air-tight containers. Two hundred cubic centimeters of the catalyst (i. e., sufficient catalyst pellets to occupy 200 cc.) are then transferred into the cracking chamber of the catalyst cracking unit. The catalyst is raised to 800° F. and a vaporized gas-oil (for example, 35.5–37.5 A. P. I. East Texas gas-oil having 700–730° end-point) is passed through the unit at a rate of 30 liters of liquid oil per hour per 20 liters of catalyst. The exiting vapors from the cracking chamber are condensed at a temperature of 60° F. The condensate thus collected is termed the first-cycle condensate.

At the end of 10 minutes the cracking is discontinued and the catalyst is regenerated by raising its temperature to 900° F. and passing air through the catalyst to convert the deposited carbon into $CO$ and $CO_2$. The passage of air is continued until no substantial amounts of carbon monoxide or carbon dioxide are present in the existing gases.

The air flow is then discontinued and the temperature of the catalyst is reduced to 800° F. and a second cycle of 10 minutes is carried out in the manner previously described. Repeated cycles of regeneration and cracking are carried out.

The condensates collected in the manner previously described are distilled in an Engler distillation unit whose condenser temperature is maintained at 60° F. to determine the content of 410° F. end-point gasoline in the synthetic crude. It will be observed that this synthetic gasoline does not represent the entire yield of such gasoline produced in the process, since it does not include the gasoline fractions lost with the gases removed from the cracking unit, nor does it include the gasoline fractions lost in the Engler distillation. Howecer, for the purpose of comparing the activity of catalysts, the per cent of such 410° F. end-point gasoline thus determined for cycles other than the first cycle may be taken to be an index of the activity of the catalysts.

The results obtained by employing the above catalysts in cracking are illustrated by the following table:

Table 2

| Catalyst Source | A. P. I. Distillate | Per Cent Gasoline | Per Cent Coke | Per Cent Coke per Per Cent Gasoline | Per Cent Gas |
| --- | --- | --- | --- | --- | --- |
| Example I | 44.9 | 42.4 | 3.4 | .08 | 6.2 |
| Example II | 42.8 | 40.2 | 4.5 | .11 | 6.7 |

It will be observed that the catalyst according to Example I had a significantly lower carbon-forming tendency, producing about 0.7 as much as formed by that of Example II for the same gasoline yield. The gasoline yield is also about 5% greater. The gas formed at the higher yield is also lower by about 10%. The catalyst of Example I is superior to that formed in the conventional method followed in Example II, since it formed a greater amount of gasoline and a smaller amount of carbon and smaller gas yield.

The decreased carbon and gas formation for greater gasoline yield is, I believe, due to the lower iron content of the clay produced as a result of maintaining the acid concentration during acid treatment of the clay.

In my process, the clay to be treated is mixed in a treater with a portion of the acid at the desired concentration, and as the acid is consumed in reacting with the clay and as the acid concentration falls, additional acid is added to maintain the desired concentration. This stage addition of acid to the partially reacted clay and partially consumed acid continues during the treat and maintains the desired concentration in the mixture of clay and acid undergoing reaction until the total amount of acid has been added. During the operation of acid treatment the mixture of clay and acid is agitated and heated to a temperature of about 180 to 220° F. The process thus continues at a substantially constant concentration for the time necessary at the temperature and reaction conditions employed to cause the acid consumption necessary to give the desired alumina extraction. The clay is then removed from the mixture of acid and salts extracted from the clay. The solution thus separated from the clay which is the final product of extraction contains acid at a concentration substantially equal to the terminal concentration of the acid resulting from the extraction of the clay, and contains also the salts resulting from the extraction of the clay.

While the examples employed used a concentration of about 10%, I may employ a substantially constant acid concentration above about 5%, for example, up to about 30%, but preferably within the range of about 7% to 15%.

Instead of maintaining the concentration constant, as, for example, at 10%, the concentration may be permitted to fall through a controlled range. For example, the clay may be mixed with acid at a concentration of 10% to 15% and the acid permitted to fall to 5% or 8%, and then acid added in an amount sufficient to adjust the concentration to from 10% to 15% and the reaction permitted to proceed until the concentration falls to about 5% to 8%.

Various schedules may thus be employed within the spirit of my invention, but in all such schedules the clay during its entire contact with the acid is contacted in a reaction mix at a relatively constant concentration of more than about 5%, for example, in the range of 5% to 15%, and preferably above about 7% to 8%. Alternatively, in stage addition of acid the concentration may range in a plurality of stages of adjusted concentration, as described, of 5% to 15% and preferably within the range of about 7% to 15%. I prefer, however, to maintain the concentration substantially constant and varying but within as narrow a range as practicable.

It will be observed that in such schedule of operations the clay is first contacted with acid which contains the least concentration of alumina and that, as the reaction progresses, the alumina content of the slurry, i. e., the aluminum compounds in the slurry, rises as a result of extraction of alumina from the clay. The clay is thus exposed to a reaction mix with a rising alumina content during the progress of the treat of clay. The acid concentration is either constant or is falling as the treat of the clay progresses and as the alumina is being extracted from the clay except for such periods as new fresh acid is added to adjust the concentration.

By this procedure the extraction of iron, which occurs most rapidly from raw or partially treated clay, is accelerated. The fresh acid containing the lowest concentration of iron salts in solution is more active to extract these iron salts as compared with the acid present in a later stage of the treat. Such latter acid solution contains a higher concentration of iron and aluminum salt.

The clay, after it has been reacted, is separated from the acid solution. The acid solution may be separated from the clay without dilution of the acid liquor. Such separation without substantial dilution may be made by filtration or by decantation. After the bulk of the solution has been removed, the clay may be washed with water.

On washing the clay thus produced, the precipitation of hydrated iron oxide by hydrolysis or the separation of other iron compounds from the residual solution and the deposition of such oxides or compounds on the clay will be minor.

In order to further limit the amount of such residual solution in the clay, the clay may be displacement washed. Thus the filter cake may be given a displacement wash by passing water under pressure through the cake under conditions of flow to cause minimum mixing in the cake. The water pushes the solution out of the cake. The cake may then be further washed or slurried with fresh water without material re-deposit of iron hydrate or iron compounds on the clay.

The clay may be used as a catalyst or as an absorbent for water or gases or vapors and as a decolorant in treating vegetable, mineral, or animal oils, fats, and waxes.

I may also incorporate with the acid activated clay which we have described other promoters which impart high activity for cracking and for other catalytic processes. Such materials are silica, alumina, chromium oxide, vanadium oxide, zirconium oxide, and other metallic oxide. Preferably these oxides should be in the hydrated form. When these or similar metallic compounds are employed as promoter catalysts in combination with the acid activated clay of my invention, the catalytic activity of my product is enhanced.

While I have described a particular embodiment of my invention for the purpose of illustration, it should be understood that various modifications and adaptations thereof may be made within the spirit of the invention as set forth in the appended claims.

I claim:

1. A method for acid treating an acid activatable clay with 40 to 50 pounds of sulfuric acid, calculated as anhydrous, per 100 pounds of clay, which comprises mixing said clay with a portion of the sulfuric acid to be employed for treatment of the clay at an acid concentration in said mix in the range between 10% to 15% and a solids concentration ranging from 25 to 35 pounds of clay, calculated as volatile-free, per 100 pounds of mixture, allowing said clay to react with said acid to partially consume said acid by reaction and thus reduce the acid concentration in said mix to 5% to 8%, adding additional acid to said clay to raise the concentration of acid in said mix to 10% to 15%, allowing further reaction between said acid and said clay to reduce the acid concentration in said mix to 5% to 8%, and separating said clay from the acid at a concentration between 5% to 8% upon completion of the treatment.

2. A method of acid activating a montmorillonite sub-bentonite with 40 to 125 pounds of sulfuric acid, calculated as anyhdrous, per 100 pounds of sub-bentonite, which comprises mixing with the sub-bentonite a portion of the total acid to be used at a concentration between 10% to 15%, allowing the sub-bentonite to react with the acid and thus reduce the acid concentration in the mixture to a value between 5% and 8%, adding additional acid to the sub-bentonite to raise the concentration of the acid in the mixture to a value beween 10% and 15%, allowing further reaction between the acid and the sub-bentonite to reduce the acid concentration in the mixture to a value between 5% and 8%, and separating the activated sub-bentonite from the acid at a concentration between 5% to 8% upon completion of the treatment.

3. A method of acid activating a montmorillonite sub-bentonite with 40 to 125 pounds of sulfuric acid, calculated as anhydrous, per 100 pounds of sub-bentonite, the solids concentration ranging from 25 to 35 pounds of sub-bentonite, calculated as volatile-free per 100 pounds of mixture, which comprises mixing with the sub-bentonite a portion of the total acid to be used at a concentration between 5% and 30%, maintaining the acid concentration between 5% and 30% during the acid activation of the sub-bentonite by adding the remainder of the acid in stages, and removing the activated sub-bentonite from the acid solution at a concentration between 5% and 30% upon completion of the treatment.

4. A method of acid activating a montmorillonite sub-bentonite with 40 to 50 pounds of sulfuric acid, calculated as anhydrous, per 100 pounds of sub-bentonite, the solids concentration ranging from 25 to 35 pounds of sub-bentonite, calculated as volatile-free per 100 pounds of mixture, which comprises mixing with the sub-bentonite a portion of the total acid to be used at a concentration between 5% and 30%, maintaining the acid concentration between 5% and 30% during the acid activation of the sub-bentonite by adding the remainder of the acid in stages, and removing the activated sub-bentonite from the acid solution at a concentration between 5% and 30% upon completion of the treatment.

5. In a method of acid activating a montmorillonite sub-bentonite, the improvement which comprises contacting said sub-bentonite with 40–125 pounds of sulfuric acid calculated as anhydrous, per 100 pounds of sub-bentonite, the solids concentration per 100 pounds of mixture ranging from 25–35 pounds of sub-bentonite calculated as volatile-free, said sulfuric acid having a concentration between 10% and 15%, maintaining the concentration of acid within said range during the activating treatment by adding additional acid in stages, and removing the activated sub-bentonite from the acid solution at a concentration within said range upon completion of the treatment.

WRIGHT W. GARY.

REFERENCES CITED

The following references are of record in the file of this patent:

UNITED STATES PATENTS

| Number | Name | Date |
| --- | --- | --- |
| 1,408,655 | Stratford | Mar. 7, 1922 |
| 1,752,721 | Bierce | Apr. 1, 1930 |
| 1,776,990 | Baylis | Sept. 30, 1930 |
| 1,796,107 | Jonas et al. | Mar. 10, 1931 |
| 1,796,799 | Manley et al. | Mar. 17, 1931 |
| 1,800,687 | Henderson et al. | Apr. 14, 1931 |
| 1,818,453 | Baylis (II) | Aug. 11, 1931 |
| 1,819,496 | Baylis (I) | Aug. 18, 1931 |
| 1,844,476 | Morrell | Feb. 9, 1932 |
| 1,980,569 | Belden et al. | Nov. 13, 1934 |
| 1,999,773 | McMichael | Apr. 30, 1935 |
| 2,300,878 | Drennan et al. | Nov. 3, 1942 |

Certificate of Correction

March 8, 1949.

Patent No. 2,464,127.

WRIGHT W. GARY

It is hereby certified that errors appear in the printed specification of the above numbered patent requiring correction as follows:

Column 1, line 15, after the word "such" insert *acid*; column 5, lines 9 and 10, for "dislation" read *distillation*; line 19, for "Howecer" read *However*; and that the said Letters Patent should be read with these corrections therein that the same may conform to the record of the case in the Patent Office.

Signed and sealed this 18th day of October, A. D. 1949.

[SEAL]

THOMAS F. MURPHY,
*Assistant Commissioner of Patents.*